J. H. HODDE.
MERCURY MOTOR METER.
APPLICATION FILED NOV. 9, 1910.
1,033,893.
Patented July 30, 1912.
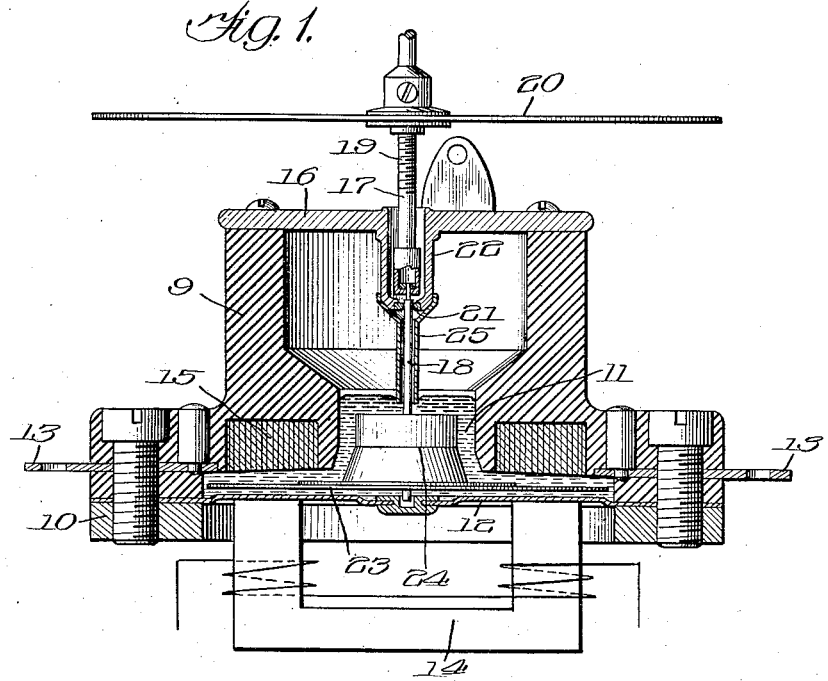
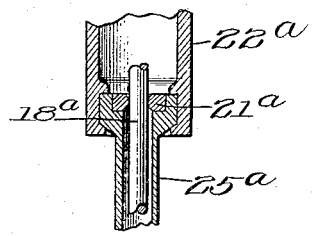

UNITED STATES PATENT OFFICE.

JACOB H. HODDE, OF SPRINGFIELD, ILLINOIS, ASSIGNOR TO SANGAMO ELECTRIC COMPANY, OF SPRINGFIELD, ILLINOIS, A CORPORATION OF ILLINOIS.

MERCURY MOTOR-METER.

1,033,893.      Specification of Letters Patent.      Patented July 30, 1912.

Application filed November 9, 1910. Serial No. 591,475.

*To all whom it may concern:*

Be it known that I, JACOB H. HODDE, a citizen of the United States, residing at Springfield, in the county of Sangamon, State of Illinois, have invented certain new and useful Improvements in Mercury Motor-Meters, of which the following is a specification, reference being had to the accompanying drawings.

This invention relates to mercury motor meters of the type in which an armature is rotatable in mercury on a spindle rising from the mercury, and it has for its object the provision of new and improved devices designed to reduce to a minimum the friction of the rotating element. In motor meters of this type, in which the armature is made of a thin plate of copper, the mercury inevitably carries in solution a small amount of copper, especially when such an instrument has been considerably agitated and shaken around or possibly turned upside down in shipment. In such case, a portion of the copper amalgam becomes oxidized, forming a film of dross on the surface of the mercury. When in the handling of the meter the mercury and dross are splashed onto the jewel forming the bearing for the spindle in the upper wall of the mercury chamber, it has a tendency to dry off from the jewel bearing the small amount of oil necessary to the proper running of the meter, leaving in place of the oil a sticky composition of oil and copper oxid which has the effect of slowing down the meter on low loads.

It is the object of this invention to provide a construction which shall overcome this difficulty, protecting from the dross both the spindle at the point where it emerges from the mercury and the jewel bearing for the spindle. The means by which I have accomplished this result are shown in the accompanying drawings and hereinafter specifically described. That which I believe to be new is set forth in the claims.

In the drawings,—Figure 1 is a central vertical section through a meter embodying my invention. Fig. 2 is a vertical section showing the jewel bearing for the spindle, illustrating a modified form of my improved device.

Referring to Fig. 1, 9—10 indicate the upper and lower members of the casing, inclosing the mercury chamber 11, the lower member 10 comprising a non-magnetic metal plate 12.

13 indicates the contacts extending a short distance into the mercury chamber.

14 indicates an electro-magnet energized in any appropriate manner to produce a suitable field, the pole-pieces of such magnet extending up close to the bottom-plate 12.

15 indicates a return plate of any ordinary suitable type.

16 indicates the cover-plate suitably secured to the upper end of the casing member 9.

17—18 indicate the upper and lower members of a two-part spindle, suitably joined so as to rotate together. The upper member 17 is provided with a worm 19 by which motion is to be communicated to any suitable type of indicating or recording devices not shown. 20 indicates a damping disk mounted on said spindle 17, adapted to be acted upon by any suitable type of permanent magnets not shown. The lower spindle member 18 is mounted in a jewel bearing 21 carried by the lower end of a sleeve 22 depending from the cover-plate 16. Upon the lower end portion of the spindle 18 are mounted an armature 23 formed of a thin disk of copper, and a float 24 formed of wood or other suitable material. The part 24 is so proportioned as to float in the mercury supporting the weight of the armature, the spindles, the damping disk 20, and all connected parts, there being provided no bearing for the lower end of the spindle 18.

Inasmuch as the parts so far described are all well-known and form of themselves no part of the present invention, it is not believed that further description is necessary herein.

The means for protecting the jewel bearing 21 from the mercury and dross and in some cases for keeping the dross away from the spindle 18 at the point where it emerges from the mercury without its retarding the rotation of the spindle, consists of the sleeve 25 of non-amalgamating metal, preferably steel, whose flaring upper end embraces the lower end of the sleeve 22, the lower end of which in the construction shown dips a short distance into the mercury. The inside diameter of the sleeve 25 is very slightly greater than the outside diameter of the spindle 18 so that not only is the mercury prevented from splashing up onto the jewel 21, but, owing to the tendency of mercury to hold together in globules it is almost impossible for the mercury to work in along the spindle 18 into contact with the jewel bearing even when the meter is in inverted position. Moreover, the space is so narrow that it tends to act as a strainer to keep out the dross even when the pure mercury is permitted to enter the sleeve 25. Thus the dross is kept away from the spindle 18 altogether, preventing any undue retarding effect and reducing the friction to a minimum.

I do not limit myself to the exact construction shown in which the sleeve 25 extends clear to or below the surface of the mercury, except as hereinafter claimed, since the protection to the jewel is practically complete whether or not the sleeve extends below the surface of the mercury.

In Fig. 2 I have illustrated a modification. In this figure, the corresponding parts are numbered the same as in Fig. 1, but with the addition of the letter *a*. In this modification, the sleeve 25ª is telescoped into the sleeve 22ª, the lower end of the receiving sleeve being swaged to prevent the withdrawal of the sleeve 22ª.

What I claim as my invention and desire to secure by Letters Patent is,—

1. In a mercury motor meter, in combination, a mercury chamber, mercury therein, a rotatable element having a spindle, a bearing for said spindle above the surface of the mercury, and a sleeve surrounding said bearing and at its lower end portion surrounding said spindle closely but not in contact with it, said sleeve fitting said spindle so closely as to prevent the passage of mercury between them.

2. In a mercury motor meter, in combination, a mercury chamber, mercury therein, a rotatable element having a spindle rising out of the mercury, a bearing for said spindle above the surface of the mercury, and a sleeve surrounding said bearing and at its lower end portion surrounding said spindle closely but not in contact with it, said sleeve extending normally a short distance below the surface of the mercury and serving as a strainer to prevent the dross contained in the mercury from coming into contact with the spindle.

3. In a mercury motor meter, in combination, a mercury chamber, mercury therein, a rotatable element having a spindle rising out of the mercury, a sleeve extending into said mercury chamber, a second sleeve secured to and depending from the lower end of the first-mentioned sleeve, said second sleeve at its lower end portion surrounding said spindle closely but not in contact with it, but adapted normally to prevent the passage of mercury between said spindle and the wall of said sleeve and a bearing for said spindle mounted in one of said sleeves at about the point of connection between said sleeves.

4. In a mercury motor meter, in combination, a mercury chamber, mercury therein, a rotatable element having a spindle rising out of the mercury, a sleeve extending downward into said mercury chamber, a jewel bearing for said spindle mounted in the lower end of said sleeve, and a second sleeve embracing and secured to the lower end of said first-mentioned sleeve and at its lower end portion surrounding said spindle closely but not in contact with it, and normally extending into the mercury in said chamber and adapted normally to prevent the passage of the mercury between the spindle and the wall of the sleeve.

5. In a mercury motor meter, in combination, a mercury chamber, mercury therein, a rotatable element, a spindle therefor, and a sleeve around said spindle having its lower end closely surrounding said spindle and adapted to extend into the mercury in said chamber, said sleeve fitting said spindle so closely as to normally prevent the passage of mercury between the spindle and the wall of said sleeve.

JACOB H. HODDE.

Witnesses:
GRACE L. HOOPER,
R. C. LAUPHIER.